Aug. 22, 1950 — O. ELSEBUSCH — 2,519,446
ANTIDRAFT DEVICE
Filed Aug. 26, 1946 — 2 Sheets-Sheet 1
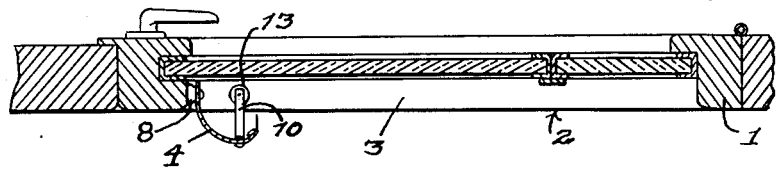
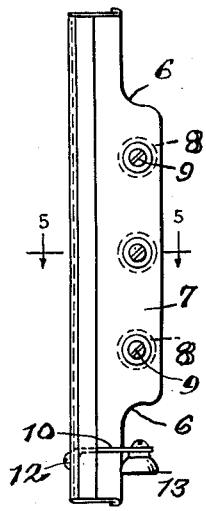
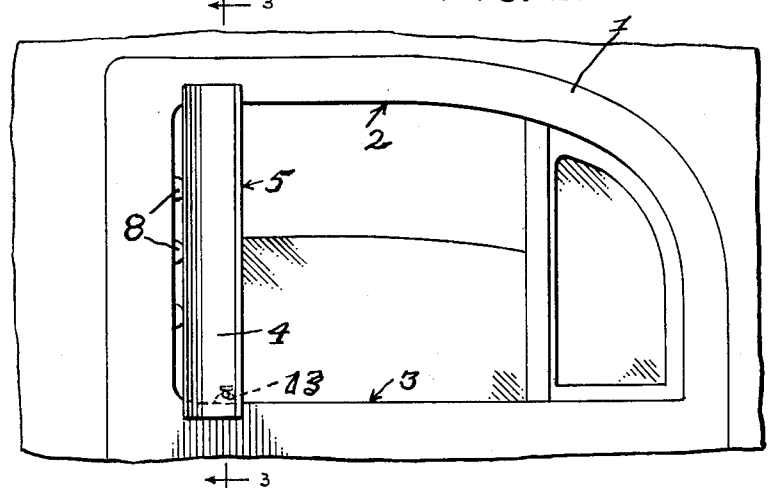
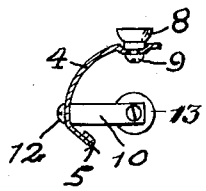
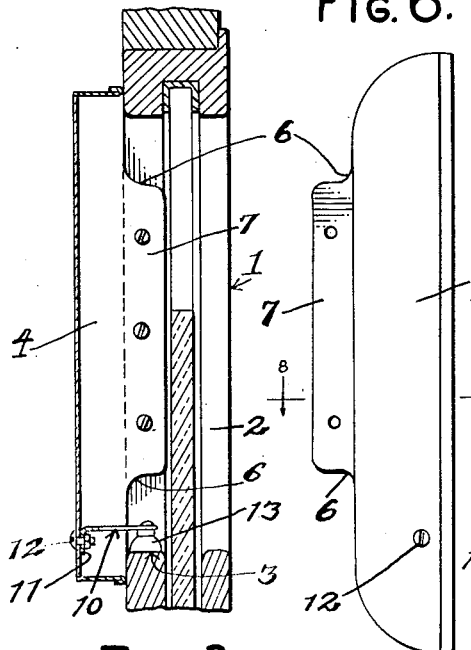
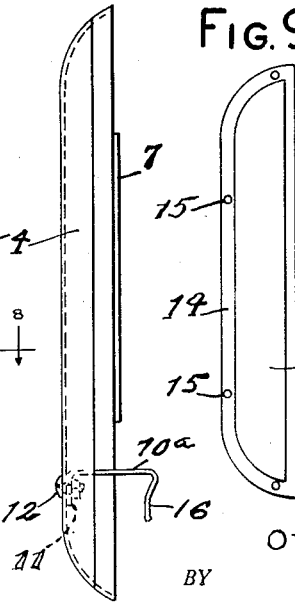
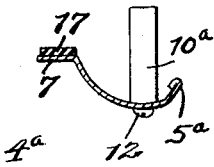
INVENTOR,
OTTO ELSEBUSCH.
BY
E. E. Vrooman & Co.,
ATTORNEYS.

Aug. 22, 1950           O. ELSEBUSCH           2,519,446
ANTIDRAFT DEVICE
Filed Aug. 26, 1946                        2 Sheets-Sheet 2
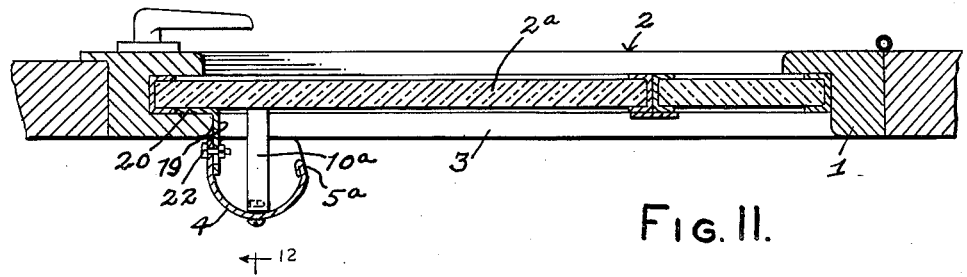
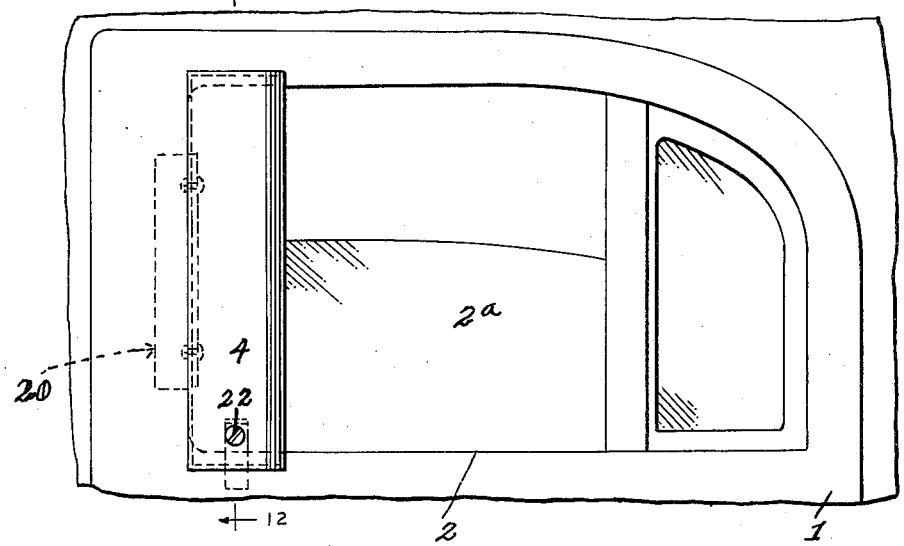
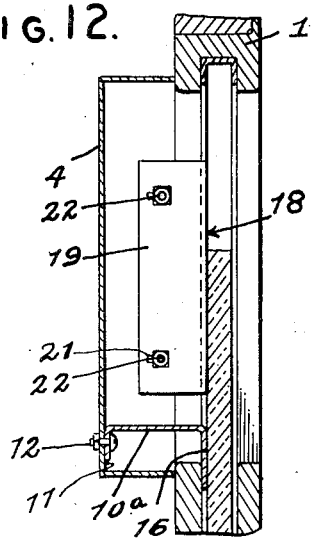
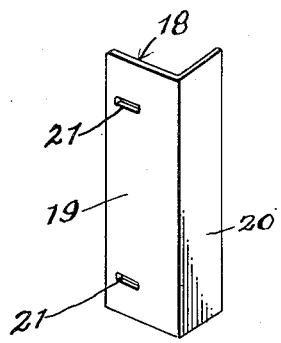
INVENTOR,
OTTO ELSEBUSCH.
BY
E. E. Vrooman & Co.
ATTORNEYS Patented Aug. 22, 1950

2,519,446

UNITED STATES PATENT OFFICE 2,519,446

ANTIDRAFT DEVICE

Otto Elsebusch, Los Angeles, Calif.

Application August 26, 1946, Serial No. 692,993

4 Claims. (Cl. 98—2)

1

This invention relates to an anti-draft device.

An object of the invention is the construction of a simple and efficient wind deflector to prevent drafts in an automobile, and wind blowing onto the occupants of the rear seat of an automobile.

Another object of the invention is the construction of a novel and efficient deflector or antidraft device which is adapted to be attached to the door of an automobile or motor vehicle, and which device will prevent a draft occurring over the shoulder of the operator, as well as protect anyone in the rear of the operator.

This application discloses certain novel and useful improvements over the structure disclosed in my prior application, Serial Number 579,013, filed February 21, 1945, and entitled "Anti-draft device" now Patent No. 2,465,345.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a fragmentary horizontal sectional view of a motor vehicle showing the anti-draft device in position thereon, while, Figure 2 is a view in side elevation of the same.

Figure 3 is a vertical sectional view taken on line 3—3, Figure 2, and looking in the direction of the arrows.

Figure 4 is a view in side elevation of the device.

Figure 5 is a horizontal sectional view taken on line 5—5, Figure 4, and looking in the direction of the arrows.

Figure 6 is a view in side elevation of another embodiment of this invention, while.

Figure 7 is an end view in elevation of the same.

Figure 8 is a horizontal sectional view taken on line 8—8, Figure 6, and looking in the direction of the arrows.

Figure 9 is an inside view in elevation of another modification of this invention, which modification is particularly adapted for use on truck cabs.

Figure 10 is a fragmentary horizontal sectional view of a motor vehicle showing another embodiment of an anti-draft device in position thereon, while Figure 11 is a view in side elevation of the same.

Figure 12 is a vertical sectional view taken on line 12—12, Figure 11, and looking in the direction of the arrows.

Figure 13 is a perspective view of the angle-attaching plate.

2

Referring to the drawings, in which the preferred embodiment of the invention is illustrated in Figs. 1 to 6, 1 designates the automobile or truck door and 2 is the window, which window is provided with the usual sill 3.

The anti-draft device comprises a curved or substantially semi-cylindrical body 4, which may be made of any suitable material such as metal or plastic, or the like.

The body 4 is curved inwardly at its outer edge 5 for the purpose of deflecting the wind outwardly through the window 2. The body 4 is also cut away at 6 and 7, Figs. 3 and 6, to enable the device to readily fit into windows of different heights. This cutting away at 6 produces at the inner longitudinal edge of body 4 an attaching flange 7, (Figs. 3, 4, and 6). In the embodiment in Figure 4 vacuum cups 8 are fastened by screws 9 to the attaching flange 7. By this arrangement the device can be attached to the window 2 as shown in Figure 1; the cups 8 engage the wall of the opening, without marring the finish of the vehicle.

To securely fasten the body 4 at its bottom to the door 1 I provide a clip or fastening arm 10. This fastening arm has a right angled extension 11 on its inner end, and through this extension 11 extends screw bolt 12. On the outer end of fastening arm 10 is a vacuum cup 13 (Fig. 3). This vacuum cup 13 engages the horizontal sill 3, as clearly shown in Figures 1 and 3 of the drawings.

In the embodiment shown in Figures 6 and 7 the general structure of the device is the same as with the embodiment illustrated in Figures 1 to 5, with the exception that the upper and lower ends of the embodiment are rounded, and are not at right angles as is the case with the preferred embodiment, Figures 3 and 5.

In the embodiment shown in Figure 9 the device is particularly adapted for use on trucks. This embodiment has a curved body 4a with a flange 14 extending along one edge and over the top and bottom of the body as clearly seen in Figure 9, with screw receiving apertures 15 formed in said flange as shown.

In the embodiment shown in Figures 6 and 7 a clip or fastening arm 10a is used which is very similar to the structure shown in Figures 3 and 4. This modified form of the fastening arm is provided with a depending finger 16 which is adapted to hook upon the window sill 3 for efficiently fastening and retaining the device in place on the vehicle. As shown in Figure 8 a rubber piece 17 may be imposed between the fastening flange 7 and the body of the automobile or truck.

Referring to the embodiment in Figures 10 to 13, an angle attaching plate 18 is provided for securing the body 4 to the vehicle. The plate 18 comprises a primary portion 19 and an auxiliary portion 20; these portions are at right angle. The primary portion 19 is provided preferably with a pair of parallel elongated apertures or slots 21. When the angle plate 18 and body 4 are assembled bolts 22 are placed in the body 4 and extend into the slots 21, whereby the body 4 is adjustably mounted on said angle attaching plate 18. The plate 18 is preferably placed with the auxiliary portion 20 between the door 2 and the glass 2ª as clearly shown in Figure 10. By this arrangement the use of screws or like fastening means is eliminated in mounting the device upon the vehicle door. Otherwise the anti-draft device is similar in construction with the embodiment shown in Figures 3 and 6.

The vacuum cup 13 and the finger 16 on the fastening arms 10 and 10ª respectively, constitute sill fastening means for securing the lower ends of the devices more efficiently in position.

In Figure 8 the bent end edge 5ª is more radically extending inward, than with the modification illustrated in Figure 5.

In placing the device shown in Figures 6 and 7 upon the vehicle the screw 12 and its nut may be loosened to afford an easy placing of the fastening arm and finger in position. Then the screw and nut are tightened whereupon the fastening arm is efficiently held in its mounted position.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. An anti-draft device having a vertical body of sheet material of a length sufficient to span the vertical dimension of a vehicle window said body having a pair of vertical edges, said body being curved in cross-section and having a main portion of relatively large radius and one edge portion of relatively small radius forming a continuous curve in one direction, a flange of less vertical extent than the body whereby to fit between the sill and lintel of the window frame, said flange extending tangentially from the opposite vertical edge of the body, and fastening means carried by said flange to engage the side of said window frame.

2. An anti-draft having a vertical body of sheet material of a length sufficient to span the vertical dimension of a vehicle window said body having a pair of vertical edges, said body being curved in cross-section and having a main portion of relatively large radius and one edge portion of relatively small radius forming a continuous curve in one direction, a flange of less vertical extent than the body whereby to fit between the sill and lintel of the window frame, said flange extending tangentially from the opposite vertical edge of the body, said flange having vertically spaced sockets formed therein, and suction cups secured in said sockets and engageable with the side of said window frame.

3. An anti-draft device having a vertical body of sheet material of a length sufficient to span the vertical dimension of a vehicle window said body having a pair of vertical edges, said body being curved in cross-section and having a main portion of relatively large radius and one edge portion of relatively small radius forming a continuous curve in one direction, a flange of less vertical extent than the body whereby to fit between the sill and lintel of the window frame, said flange extending tangentially from the opposite vertical edge of the body, fastening means carried by said flange to engage the side of said window frame, a brace arm projecting radially inward of the concave side of the body at the junction of said curved main and edge portions, and securing means at the fore end of said arm adapted for attachment to the sill of the window.

4. An anti-draft device having a vertical body of sheet material of a length sufficient to span the vertical dimension of a vehicle window said body having a pair of vertical edges, said body being curved in cross-section and having a main portion of relatively large radius and one edge portion of relatively small radius forming a continuous curve in one direction, a flange of less vertical extent than the body whereby to fit between the sill and lintel of the window frame, said flange extending tangentially from the opposite vertical edge of the body, said flange having vertically spaced sockets formed therein, suction cups secured in said sockets and engageable with the side of said window frame, a brace arm projecting radially inward of the concave side of the body at the junction of said curved main and edge portions, and securing means at the fore end of said arm adapted for attachment to the sill of the window.

OTTO ELSEBUSCH.

REFERENCES CITED

The following references are of record in the file of this patent:

UNITED STATES PATENTS

| Number | Name | Date |
|---|---|---|
| 1,644,398 | Rose | Oct. 4, 1927 |
| 1,849,176 | De Fries | Mar. 15, 1932 |
| 1,891,390 | Liebig | Dec. 20, 1932 |
| 1,917,093 | Cameron | July 4, 1933 |
| 1,968,948 | Lang | Aug. 7, 1934 |
| 1,992,413 | Callahan | Feb. 26, 1935 |
| 2,065,085 | Lynes | Dec. 22, 1936 |
| 2,106,413 | Wagner | Jan. 25, 1938 |
| 2,141,442 | Mead et al. | Dec. 27, 1938 |
| 2,189,391 | Bowdish | Feb. 6, 1940 |

FOREIGN PATENTS

| Number | Country | Date |
|---|---|---|
| 338,194 | France | Mar. 12, 1904 |